(12) United States Patent
Dell'Anna et al.

(10) Patent No.: US 7,811,494 B2
(45) Date of Patent: Oct. 12, 2010

(54) CABLE MANUFACTURING PROCESS

(75) Inventors: Gaia Dell'Anna, Milan (IT); Alberto Bareggi, Milan (IT); Sergio Belli, Milan (IT)

(73) Assignee: Prysmian Cavi E Sistemi Energia S.r.l., Milan (IT)

( * ) Notice: Subject to any disclaimer, the term of this patent is extended or adjusted under 35 U.S.C. 154(b) by 64 days.

(21) Appl. No.: 11/667,939

(22) PCT Filed: Nov. 23, 2004

(86) PCT No.: PCT/EP2004/013289

§ 371 (c)(1),
(2), (4) Date: Oct. 24, 2007

(87) PCT Pub. No.: WO2006/056218

PCT Pub. Date: Jun. 1, 2006

(65) Prior Publication Data

US 2008/0128939 A1    Jun. 5, 2008

(51) Int. Cl.
*B29C 47/04* (2006.01)
(52) U.S. Cl. .................. 264/171.17; 264/171.13; 264/171.14; 264/173.11; 264/173.12; 425/133.1
(58) Field of Classification Search ............ 264/171.17, 264/173.16, 171.13, 171.14, 173.11, 173.12; 425/133.1
See application file for complete search history.

(56) References Cited

U.S. PATENT DOCUMENTS

| | | | |
|---|---|---|---|
| 3,404,432 A * | 10/1968 | White et al. | ........ 425/113 |
| 3,737,490 A | 6/1973 | Nicholson | |
| 4,093,414 A | 6/1978 | Swiatovy, Jr. | |
| 4,378,102 A * | 3/1983 | Portis et al. | ........ 248/460 |
| 5,153,381 A | 10/1992 | Ganatra et al. | |
| 5,431,867 A * | 7/1995 | Matsushita et al. | ........ 264/40.1 |

(Continued)

FOREIGN PATENT DOCUMENTS

EP    0 534 208 B1    6/1996

(Continued)

*Primary Examiner*—Joseph S. Del Sole
*Assistant Examiner*—Robert Dye
(74) *Attorney, Agent, or Firm*—Finnegan, Henderson, Farabow, Garrett & Dunner, L.L.P.

(57) ABSTRACT

A process for manufacturing a cable which includes a conductor; an inner semiconductive layer surrounding the conductor and having a thickness lower than or equal to 0.4 mm; and an insulating layer surrounding the inner semiconductive layer. The process includes the step of co-extruding the inner semiconductive layer and the insulating layer and includes: a) providing a first annular flow of inner semiconductive material and a second annular flow of insulating material; b) contacting the outer surface of the first annular flow and the inner surface of the second annular flow at an axial distance from the contacting point where the inner surface of the first annular flow contacts the conductor; c) selecting in combination the predetermined feeding speed and the contacting point as a function of the dynamic viscosity of the inner semiconductive material and of the insulating material, so that a ratio between the shear stress of the inner semiconductive layer at the radially inner wall of the extrusion die and the shear stress of the insulating layer at the radially outer wall of the extrusion die, in proximity of the contacting point, is about 0.5 to 4; and d) compression extruding the insulating layer and the inner semiconductive layer onto the conductor.

22 Claims, 5 Drawing Sheets

U.S. PATENT DOCUMENTS

| | | | |
|---|---|---|---|
| 5,518,618 A * | 5/1996 | Mulder et al. | 210/605 |
| 5,681,514 A * | 10/1997 | Woody | 264/104 |
| 6,534,715 B1 | 3/2003 | Maunder et al. | |
| 7,367,373 B2 | 5/2008 | Spruell | |
| 2002/0153635 A1 * | 10/2002 | Belli et al. | 264/169 |

FOREIGN PATENT DOCUMENTS

| | | |
|---|---|---|
| EP | 0 981 821 B1 | 7/2002 |
| WO | WO-01/46965 A1 | 6/2001 |
| WO | WO-2004/003940 A1 | 1/2004 |

* cited by examiner

CABLE MANUFACTURING PROCESS

CROSS REFERENCE TO RELATED APPLICATION

This application is a national phase application based on PCT/EP2004/013289, filed Nov. 23, 2004, the content of which is incorporated herein by reference.

BACKGROUND OF THE INVENTION

1. Field of the Invention

The present invention relates to a process for manufacturing a cable.

In particular, the present invention relates to a process for manufacturing an electrical cable for transmission or distribution of electrical power at medium or high voltage.

More in particular, the present invention relates to a process for manufacturing an electrical cable having a structure with a very compact design.

2. Description of the Related Art

In the present description, the term medium voltage is used to refer to a tension typically from about 10 to about 60 kV and the term high voltage refers to a tension above 60 kV. Generally, the term low voltage refers to a tension lower than 10 kV, typically greater than 100 V. The term very high voltage is also sometimes used in the art to define voltages greater than about 150 or 220 kV, up to 500 kV or more.

Cables for power transmission or distribution at medium or high voltage generally have a metal conductor which is surrounded, respectively, by an inner semiconductive layer, an insulating layer and an outer semiconductive layer. In the following of the present description, said predetermined sequence of elements will be indicated with the term of "cable core".

In a position radially external to said core, the cable is provided with a metal shield (or screen), usually made of aluminium, lead or copper. Generally, the metal shield consists of a continuous tube or of a metallic tape shaped according to a tubular form and welded or sealed to ensure hermeticity. Alternatively, the metal shield is formed of a plurality of metal wires.

The metal shield performs an electrical function by creating, inside the cable, as a result of direct contact between the metal shield and the outer semiconductive layer of the cable core, a uniform electrical field of the radial type, at the same time cancelling the external electrical field of said cable.

The metal shield may also provide hermeticity against the exterior of the cable by interposing a barrier to water penetration in the radial direction.

A further function of the metal shield is that of withstanding short-circuit currents.

In a configuration of the unipolar type, the cable is provided with a polymeric oversheath in a position radially external to the metal shield mentioned above.

Moreover, cables for power transmission or distribution are generally provided with one or more layers for protecting said cables from accidental impacts which may occur on their external surface.

Accidental impacts on a cable may occur, for example, during transport thereof or during the laying step of the cable in a trench dug into the soil. Said accidental impacts may cause a series of structural damages to the cable, including deformation of the insulating layer and detachment of the insulating layer from the semiconductive layers, damages which may cause variations in the electrical voltage stress of the insulating layer with a consequent decrease in the insulating capacity of said layer.

In the cables which are currently available in the market, for example in those for low or medium voltage power transmission or distribution, metal armours capable of withstanding said impacts are usually provided in order to protect said cables from possible damages caused by accidental impacts. Generally, said armours are in the form of tapes or wires (preferably made of steel), or alternatively in the form of metal sheaths (preferably made of lead or aluminum). An example of such a cable structure is described in U.S. Pat. No. 5,153,381.

European Patent No 981,821 in the name of the Applicant, discloses a cable which is provided with a layer of expanded polymeric material in order to confer to said cable a high resistance to accidental impacts, said layer of expanded polymeric material being preferably applied radially external to the cable core. Said proposed technical solution avoids the use of traditional metal armours, thereby reducing the cable weight as well as making the production process thereof easier.

The Applicant has perceived the need of providing a cable with a compact cable core, i.e. with a cable core design having reduced thicknesses of the semiconductive layers and of the insulating layer with respect to conventional cables, in order to reduce the cable size and weight for advantageously enhancing the handling, flexibility and transport thereof, without decreasing the overall electrical and mechanical resistance properties of the cable.

However, the Applicant has noted that the production of such a compact cable core can not be carried out—at the desired manufacturing speed—by using the manufacturing processes known in the art which are unsuitable for providing the desired results.

In order to produce a compact cable core which is provided with a very thin inner semiconductive layer (i.e. having a thickness lower than or equal to 0.4 mm), the Applicant has noted that the known extrusion techniques, according to which the flows of the different materials forming the cable core constitutive layers are kept separate from each other and separately extruded onto the cable core being formed, give rise to a plurality of drawbacks which do not allow the desired cable core to be produced at a reasonable speed.

For instance, in case a remarkable reduction of the thickness of the inner semiconductive layer is desired to be obtained, the known cable manufacturing processes give rise to the formation of a non-homogeneous thickness of the inner semiconductive layer, either in the longitudinal or in the radial directions, as well as tearings thereof during extrusion of the inner semiconductive layer onto the cable conductor. This is due to the fact that, while moving along the extruder head, the conductor exerts a pulling force on the very thin extruded inner semiconductive layer, thereby causing the above mentioned defects to occur. This aspect is even more stressed when the cable conductor is moved along the extruder head at a predetermined feeding speed which is sufficiently high (e.g. at a conventional feeding speed of about 30 m/min) to allow an industrial productivity to be carried out. Therefore, the combination of a relatively high cable conductor feeding speed with a very thin inner semiconductive layer to be extruded generally produces a defective cable core which is unacceptable and thus discarded.

Moreover, in accordance with the known cable manufacturing processes, in case a reduced thickness of the inner semiconductive layer is requested to be obtained, the length of the extrusion channel—which is used for extruding the inner semiconductive layer—is sensibly greater than the average height thereof (the height of the channel is measured in a plane perpendicular to the channel longitudinal walls). This aspect causes a remarkable increase of the extrusion pressure inside the extruder head that is due to a decrease of the extrusion channel cross-section and, as a consequence, to an increase of the extruded material speed moving along the extrusion channel. Therefore, in order to reduce the pressure at the extruder head, the extrusion output of the inner semiconductive layer is set to a lower value so as to reduce the speed of the inner semiconductive in the extrusion channel, thereby negatively affecting the cable manufacturing process productivity.

Furthermore, in accordance with the known cable manufacturing processes, in case a reduced thickness of the inner semiconductive layer is requested to be obtained, a precise production and/or assembling of the dies which form the inner semiconductive layer extrusion channel remarkably influences the stability of the extruded material flux. As a consequence, a non-homogeneous distribution of the extruded material and a non-homogeneous thickness of the inner semiconductive layer onto the cable conductor can occur.

Conventional cable manufacturing processes are also known according to which a cable multilayer element is co-extruded onto the cable conductor by causing the single layers of said multilayer element to contact each other before being extruded onto the conductor so that the multilayer element is formed at a position which is upstream of the contacting point between the cable conductor and the cable multilayer element.

For instance, document U.S. Pat. No. 3,737,490 discloses a method of manufacturing an extruded composite covering of an electric cable on a continuously advancing core by means of a float-down process, said covering comprising two or more layers of different covering materials. The method comprises causing the core to pass through the core tube of an extrusion machine which feeds extruded, peripherally continuous layers of the covering materials simultaneously towards the outlet end of the extrusion machine; causing the extruded layers to come into complete and intimate interfacial contact upstream of the outlet end of the extrusion machine; effecting continuous treatment of the composite covering so formed by passing the covered core through a chamber hermetically sealed to the outlet end of the extrusion machine and containing a fluid medium at a super-atmospheric pressure; and, at the same time, injecting fluid under pressure into the interior of the core tube and maintaining the fluid at a pressure which is less than that of the fluid medium by an amount such that the pressure difference across the extruded composite covering at the extrusion orifice is sufficient to cause the extruded composite covering to collapse firmly on to the core as it emerges from the extrusion machine but is insufficient to force the extruded composite covering back along the core tube. Moreover, said document discloses a cross-head of an extrusion machine having at its outlet end an annular extrusion orifice defined by an outer die and an inner die which is secured to the forward end of a core tube extending through the head. Upstream of the extrusion orifice is an intermediate die. Semiconductive polyethylene in a plastic state is fed to the annular space between the inner die and the intermediate die through a supply passage and polyethylene in a plastic state is fed to the annular space between the intermediate die and the outer die through a supply passage. The intermediate die is so positioned with respect to the outer die and inner die that the extruded layers of the semi-conductive polyethylene and insulating polyethylene come into complete and intimate interfacial contact upstream of the extrusion orifice. By this method a composite covering comprising an inner semiconductive cross-linkable polyethylene layer of radial thickness 0.5 mm and an outer insulating cross-linkable polyethylene layer of radial thickness 2.8 mm can be applied to a sector-shaped conductor.

Document U.S. Pat. No. 4,093,414 discloses a die by which thermoplastic insulating compounds can be co-extruded for applying a foam/skin insulation over a cable conductor, especially in the manufacturing process of a telephone wire. According to said document only one tip and one extrusion die are used for applying the two layers of insulating material (a first cellular insulating layer and a second solid insulating layer over said cellular layer) with a melt-flow separator between the supplies of insulation as they approach the end of the tip through which the conductor passes. The melt flow separator keeps the insulating materials from merging before they are close to the discharge end of the single tip, said melt flow separator terminating some distance back from the end of the tip so that the disruption of the cellular structure of the inner layer can be avoided.

Document EP-534,208 discloses an extrusion head for co-extruding at least two different plastic materials that are provided by means of two feed channels which open out into a common outlet die and into a slit-shaped homogenisation zone which serves to homogenise the stream of material. The homogenisation zone for the interior material extends essentially in the axial direction, whereas the homogenisation zone for the exterior material extends essentially in the radial direction. An elongate article can be sheathed by said at least two different plastic materials.

SUMMARY OF THE INVENTION

The Applicant has observed that, in case the extruded inner semiconductive layer contacts the extruded insulating layer at a position which is upstream of the contacting point between the cable conductor and the inner semiconductive layer, the pulling action exerted on the inner semiconductive layer (while being extruded) by the cable conductor (while moving along the extrusion head) is advantageously distributed over a thickness which consists of the sum of the thicknesses of the inner semiconductive layer and of the insulating layer respectively.

Therefore, thanks to the fact that, when contacting the conductor, the inner semiconductive layer is delimited—at the radially outer portion thereof—by the presence of the insulating layer already extruded thereon and not by the fixed wall of a die suitable for extruding the inner semiconductive layer (as in the case wherein the inner semiconductive layer and the insulating layer are separately extruded onto the cable core being formed), the stretching action exerted by the cable conductor on the inner semiconductive layer already assembled with the insulating layer does not cause the formation of thickness non-homogeneities and/or tearings at the conductor/inner semiconductive layer interface.

The Applicant has further perceived that, in order to manufacture a compact cable core which is provided with a very thin inner semiconductive layer, it is necessary to make the inner semiconductive layer to contact the insulating layer at a position which is upstream of the contacting point between the cable conductor and the inner semiconductive layer and, moreover, to carry out the step of coupling the inner semiconductive material with the insulating material—at the contacting point thereof—in such a way that flux instabilities in the extruded materials do not arise during the contacting and coupling thereof along the extrusion head.

In other words, the Applicant has perceived that the extrusion conditions of the two materials (the process conditions, e.g. the material flow, as well as the geometrical conditions, e.g. reciprocal distance and configuration of the dies) influence the rheological properties at the interface between the inner semiconductive layer and the insulating layer.

Therefore, in order to ensure that the desired thickness of the inner semiconductive layer and the longitudinal uniformity thereof are achieved, the Applicant has found that, in proximity of the contacting point between the inner semiconductive layer and the insulating layer, the difference between the shear stress of the inner semiconductive material and the shear stress of the insulating material has to be as small as possible so that flux instabilities in the extruded materials are avoided, or at least remarkably reduced, and the coupling of the two materials does not give rise to the formation of deformations in the two contacting layers.

In detail, the Applicant has found that, in proximity of the contacting point between the inner semiconductive layer and the insulating layer, the ratio between the shear stress of the inner semiconductive layer and the shear stress of the insulating layer has to be comprised between 0.5 and 4.

According to one aspect thereof, the present invention concerns a process for manufacturing a cable, said cable comprising:
  a conductor;
  an inner semiconductive layer surrounding said conductor and having a thickness lower than or equal to 0.4 mm, and
  an insulating layer surrounding said inner semiconductive layer, said process comprising the steps of:
  feeding the conductor at a predetermined feeding speed to an extrusion head comprising a first extrusion channel for extruding the inner semiconductive layer and a second extrusion channel for extruding the insulating layer, said first extrusion channel and said second extrusion channel being separated from each other by a first extrusion die, and
  co-extruding the inner semiconductive layer and the insulating layer, said step of co-extruding comprising:
    providing a first annular flow of inner semiconductive material and a second annular flow of insulating material;
    contacting the outer surface of said first annular flow and the inner surface of said second annular flow at an axial distance from the contacting point where the inner surface of said first annular flow contacts the conductor;
    selecting in combination said predetermined feeding speed and said contacting point, as a function of the dynamic viscosity of the inner semiconductive material and of the insulating material, so that a ratio between the shear stress of the inner semiconductive layer at the radially inner wall of said first extrusion die and the shear stress of the insulating layer at the radially outer wall of said first extrusion die, in proximity of said contacting point, is comprised from about 0.5 to 4;
  compression extruding the insulating layer and the inner semiconductive layer onto the conductor.

Preferably, said axial distance—that is measured along the advancing direction of the cable conductor—is greater than or equal to 0.5 times the conductor diameter. More preferably, said distance is comprised in the range from about 0.6 to about 10 times the conductor diameter.

In the present description and in the following claims, the term "in proximity of the contacting point" means that the shear stress of the two extruded layers (i.e. the inner semiconductive layer and the insulating layer) is calculated at the respective extrusion die wall (the radially inner wall and the radially outer wall respectively) just before said two layers come into reciprocal contact, i.e. just before said two layers leave the respective extrusion die walls.

Preferably, the ratio between the shear stress of the inner semiconductive layer at the radially inner wall of the first extrusion die and the shear stress of the insulating layer at the radially outer wall of the first extrusion die, in proximity of the contacting point, is comprised from about 0.7 to about 3.0

More preferably, said ratio is about 1, i.e. the shear stress of the inner semiconductive layer at the radially inner wall of the first extrusion die is substantially equal to the shear stress of the insulating layer at the radially outer wall of the first extrusion die.

In the present description and in the following claims, the term "compression extruding" a layer made of a polymeric material means that, inside the extrusion head, the pressure of said polymeric material is greater than the atmospheric pressure and that, at the exit of the extrusion head, the diameter of the extruded polymeric layer is greater than or equal to the inner diameter of the extrusion die responsible for the formation of said polymeric layer (this means that at the exit of the extrusion head the diameter of the extruded polymeric layer does not successively reduce).

In accordance with the present invention, the cable manufacturing process allows to produce a very thin inner semiconductive layer, i.e. an inner semiconductive layer having a thickness lower than or equal to 0.4 Preferably, the thickness of the inner semiconductive layer is comprised in the range from about 0.05 mm to about 0.4 mm.

More preferably, the thickness of the inner semiconductive layer is comprised in the range from about 0.2 mm to about 0.3 mm.

As disclosed in document WO 04/003940, the Applicant has further observed that, by providing a cable with a protective element comprising an expanded polymeric layer suitable for conferring to the cable a predetermined resistance to accidental impacts, it is possible to make the cable design more compact than that of a conventional cable.

In fact, the Applicant has observed that by providing a cable with a protective element comprising an expanded polymeric layer it is possible to advantageously reduce the cable insulating layer thickness up to the electrical stress compatible with the electrical rigidity of the insulating material. Moreover, it is possible to reduce the thickness of the inner and outer semiconductive layers surrounding the insulating layer to make the cable core construction more compact without decreasing its electrical and mechanical resistance properties.

Preferably, the manufacturing process of the present invention is suitable for producing an electrical cable which is provided with a solid rod conductor whose outer contour profile has a regular circular cross-section.

Alternatively, the cable conductor can be made of stranded metal wires provided that the outer contour profile of the stranded structure does not contain disuniformities due to the composite conductor constitution whose entity can not be smoothed from the electrical point of view by the inner semiconductive layer.

Preferably, the cable manufacturing process of the present invention is a continuous process, i.e. the cable is produced in the absence of intermediate resting or storage phases.

In the present description and in the following claims, by "continuous process" it is meant a process in which the time required to manufacture a given cable length is inversely proportional to the advancement speed of the cable in the line, so that intermediate rest phases are missing between the conductor supply and the finished cable take-up.

Preferably, the line speed of the process according to the present invention is comprised from about 30 to about 100 m/min.

The process of the present invention further comprises the step of providing an outer semiconductive layer surrounding the insulating layer to obtain the cable core.

Successively, the process of the present invention further comprises the step of cooling the cable core, e.g. by causing the cable core to pass through an elongated open duct wherein a cooling fluid is flowing. Water is a preferred example of such cooling fluid.

Preferably, the process of the present invention further comprises the step of drying the cooled cable core so as to remove residuals of the cooling fluid, such as humidity or water droplets, particularly in case such residuals turn out to be detrimental to the overall cable performance.

Moreover, the process of the present invention further comprises the step of providing a metal shield around the cable core which can be formed from a longitudinally folded metal sheet or from helically winding wires or tapes.

Furthermore, preferably the process of the present invention comprises the step of applying an impact protecting element around the metal shield. Preferably, said impact protecting element is applied by extrusion. Preferably, said impact protecting element comprises a non-expanded polymeric layer and an expanded polymeric layer. Preferably, the expanded polymeric layer is positioned radially external to the non-expanded polymeric layer. Preferably, the non-expanded polymeric layer and the expanded polymeric layer are applied by co-extrusion.

Generally, the process of the invention further comprises the step of applying an oversheath around the metal shield. Preferably, the oversheath is applied by extrusion.

Finally, the process of the present invention comprising a further cooling step and, successively, a take-up step to collect the finished cable on a reel.

The present invention is advantageously applicable not only to electrical cables for the transport or distribution of power, but also to cables of the mixed power/telecommunications type which include an optical fibre core. In this sense, therefore, in the rest of the present description and in the claims which follow the term "conductor" means a metal conductor or a conductor of the mixed electrical/optical type.

BRIEF DESCRIPTION OF THE DRAWINGS

Further details will be illustrated in the detailed description which follows, with reference to the appended drawings, in which.

DETAILED DESCRIPTION OF THE INVENTION

Figure 1:
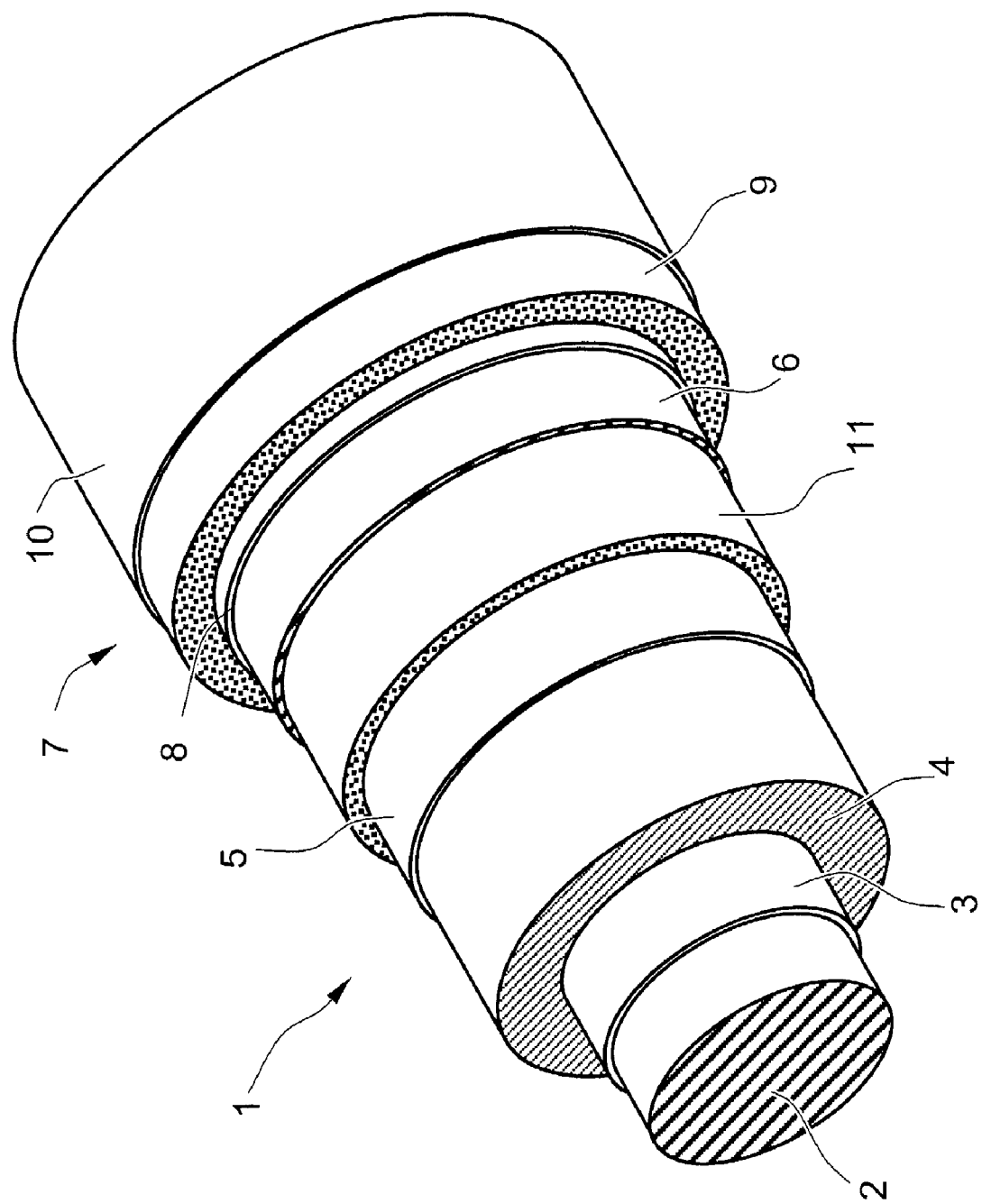
FIG. 1 is a perspective view of an electrical cable obtained with the manufacturing process of the present invention.

FIG. 1 shows a perspective view, partially in cross section, of an electrical cable 1 which is advantageously obtained with the manufacturing process of the present invention, typically designed for use in medium or high voltage range.

The cable 1 has a cable core which comprises: a conductor 2, an inner semiconductive layer 3, an insulating layer 4 and an outer semiconductive layer 5.

According to the preferred embodiment shown in FIG. 1, the conductor 2 is a metal rod, preferably made of copper or aluminium. Alternatively (not shown in FIG. 1), the conductor 2 comprises at least two metal wires, preferably of copper or aluminium, which are stranded together according to any conventional techniques to form a cord.

The cross sectional area of the conductor 2 is determined in relationship with the power to be transported at the selected voltage. Preferred cross sectional areas for compact cables produce with the process of the present invention range from 16 to 1,000 mm$^2$.

Generally, the insulating layer 4 is made of a cross-linked or non-cross-linked polymeric composition, for example selected from: polyolefins (homopolymers or copolymers of different olefins), olefin/ethylenically unsaturated ester copolymers, polyesters, polyethers, polyether/polyester copolymers and mixtures thereof. Examples of said polymers are: polyethylene (PE), in particular linear low density PE (LLDPE); polypropylene (PP); thermoplastic propylene/ethylene copolymers; ethylene-propylene rubbers (EPR) or ethylene-propylene-diene rubbers (EPDM); natural rubbers; butyl rubbers; ethylene/vinyl acetate copolymers (EVA); ethylene/methyl acrylate copolymers (EMA); ethylene/ethyl acrylate copolymers (EEA); ethylene/butyl acrylate copolymers (EBA); ethylene/α-olefin copolymers, and the like.

Preferably, said insulating layer 4 is made of a noncrosslinked base polymeric material.

In the present description, the term "insulating material" is used to refer to a material having a dielectric rigidity of at least 5 kV/mm, preferably greater than 10 kV/mm. For medium-high voltage power transmission cables, the insulating material has a dielectric rigidity greater than 40 kV/mm.

Preferably, the insulating material of the insulating layer 4 is a non-expanded polymeric material. In the present invention, the term "non-expanded" polymeric material is used to designate a material which is substantially free of void volume within its structure, i.e. a material having a degree of expansion substantially null as better explained in the following of the present description. In particular, said insulating material has a density of 0.85 g/cm$^3$ or more.

Typically, the insulating layer of power transmission cables has a dielectric constant (K) of greater than 2.

The inner semiconductive layer 3 and the outer semiconductive layer 5, both non-expanded, are obtained according to the process of the present invention (as described in details in the following of the present description), the base polymeric material and the carbon black (the latter being used to make said layers electrically semiconductive) being selected from those mentioned in the following of the present description.

In a preferred embodiment of the present invention, the inner and outer semiconductive layers 3, 5 comprise a non-crosslinked base polymeric material, more preferably a polypropylene compound.

Furthermore, the cable 1 further comprises a metal shield 6 which surrounds the cable core. According to the embodiment shown in FIG. 1, the metal shield 6 is made of a continuous metal sheet that is shaped into a tube. Preferably, the metal shield is made of aluminum or, alternatively, copper. In some cases, lead can also be used.

The metal sheet 6 is wrapped around the outer semiconductive layer 5 with overlapping edges having an interposed sealing material so as to make the metal shield watertight. Alternatively, the metal sheet is welded.

Alternatively, the metal shield 6 is made of helically wound metal wires or strips placed around said outer semiconductive layer 5.

Usually the metal shield is coated with an oversheath (not shown in FIG. 1) consisting of a crosslinked or non-crosslinked polymer material, for example polyvinyl chloride (PVC) or polyethylene (PE).

According to the embodiment shown in FIG. 1, in a position radially external to the metal shield 6, the cable 1 is provided with a protective element 7. According to said embodiment, the protective element 7 comprises an expanded polymeric layer 9 which is included between two non-expanded polymeric layers, an outer (first) non-expanded polymeric layer 10 and an inner (second) non-expanded polymeric layer 8 respectively. The protective element 7 has the function of protecting the cable from any external impact, occurring onto the cable, by at least partially absorbing said impact.

According to European Patent No 981,821 in the name of the Applicant, the polymeric material constituting the expanded polymeric layer 9 can be any type of expandable polymer such as, for example: polyolefins, copolymers of different olefins, copolymers of an olefin with an ethylenically unsaturated ester, polyesters, polycarbonates, polysulphones, phenol resins, urea resins, and mixtures thereof. Examples of suitable polymers are: polyethylene (PE), in particular low density PE (LDPE), medium density PE (MDPE), high density PE (HDPE), linear low density PE (LLDPE), ultra-low density polyethylene (ULDPE); polypropylene (PP); elastomeric ethylene/propylene copolymers (EPR) or ethylene/propylene/diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA) and ethylene/butyl acrylate (EBA); ethylene/alpha-olefin thermoplastic copolymers; polystyrene; acrylonitrile/butadiene/styrene (ABS) resins; halogenated polymers, in particular polyvinyl chloride (PVC); polyurethane (PUR); polyamides; aromatic polyesters such as polyethylene terephthalate (PET) or polybutylene terephthalate (PBT); and copolymers thereof or mechanical mixtures thereof.

For the purposes of the present description, the term "expanded" polymer is understood to refer to a polymer within the structure of which the percentage of "void" volume (that is to say the space not occupied by the polymer but by a gas or air) is typically greater than 10% of the total volume of said polymer.

In general, the percentage of free space in an expanded polymer is expressed in terms of the degree of expansion (G). In the present description, the term "degree of expansion of the polymer" is understood to refer to the expansion of the polymer determined in the following way:

$$G \text{ (degree of expansion)} = (d_0/d_e - 1) \cdot 100$$

where $d_0$ indicates the density of the non-expanded polymer (that is to say the polymer with a structure which is essentially free of void volume) and $d_e$ indicates the apparent density measured for the expanded polymer.

Preferably, the degree of expansion of said expanded polymeric layer 9 is chosen in the range from 25% and 160%, more preferably between 40% and 140%.

Preferably, the two non-expanded polymeric layers 8, 10 of said protective element 7 are made of polyolefin materials.

The two non-expanded polymeric layers 8, 10 can be made of a polymeric material selected from the group comprising: low density polyethylene (LDPE) (d=0.910-0.926 g/cm$^3$); ethylene copolymers with α-olefins; polypropylene (PP); ethylene/α-olefin rubbers, in particular ethylene/propylene rubbers (EPR), ethylene/propylene/diene rubbers (EPDM); natural rubber; butyl rubbers, and mixtures thereof.

Preferably, the two non-expanded polymeric layers 8, 10 are made of a thermoplastic material, preferably a polyolefin, such as non-crosslinked polyethylene (PE); alternatively, polyvinyl chloride (PVC) may be used.

In the embodiment shown in FIG. 1, cable 1 is further provided with a water-blocking layer 11 placed between the outer semiconductive layer 5 and the metal shield 6.

According to a preferred embodiment of the invention, the water-blocking layer 11 is an expanded, water swellable, semiconductive layer as described in WO 01/46965 in the name of the Applicant.

Preferably, said water-blocking layer 11 is made of an expanded polymeric material in which a water swellable material is embedded or dispersed.

Preferably, the expandable polymer of said water-blocking layer 11 is chosen from the polymeric materials mentioned above.

Said water-blocking layer 11 aims at providing an effective barrier to the longitudinal water penetration to the interior of the cable.

The water-swellable material generally consists of a homopolymer or copolymer having hydrophilic groups along the polymeric chain, for example: crosslinked and at least partially salified polyacrylic acid (for example the products Cabloc® from C. F. Stockhausen GmbH or Waterlock® from Grain Processing Co.); starch or derivatives thereof mixed with copolymers between acrylamide and sodium acrylate (for example products SGP Absorbent Polymer® from Henkel AG); sodium carboxymethylcellulose (for example the products Blanose® from Hercules Inc.).

In addition, the expanded polymeric material of the water-blocking layer 11 can be modified to be semiconductive.

The amount of carbon black to be added to the polymeric matrix can vary depending on the type of polymer and of carbon black used, the degree of expansion which it is intended to obtain, the expanding agent, etc. The amount of carbon black thus has to be such as to give the expanded material sufficient semiconductive properties, in particular such as to obtain a volumetric resistivity value for the expanded material, at room temperature, of less than 500 Ω·m, preferably less than 20 Ω·m. Typically, the amount of carbon black can range between 1 and 50% by weight, preferably between 3 and 30% by weight, relative to the weight of the polymer.

A preferred range of the degree of expansion of the water-blocking layer 11 is from 10% to 50%.

Furthermore, by providing cable 1 with a semiconductive water-blocking layer 11, the thickness of the outer semiconductive layer 5 can be advantageously reduced since the electrical property of the outer semiconductive layer 5 is partially performed by said water-blocking semiconductive layer. Therefore, said aspect advantageously contributes to the reduction of the outer semiconductive layer thickness and thus of the overall cable weight.

Figure 2:
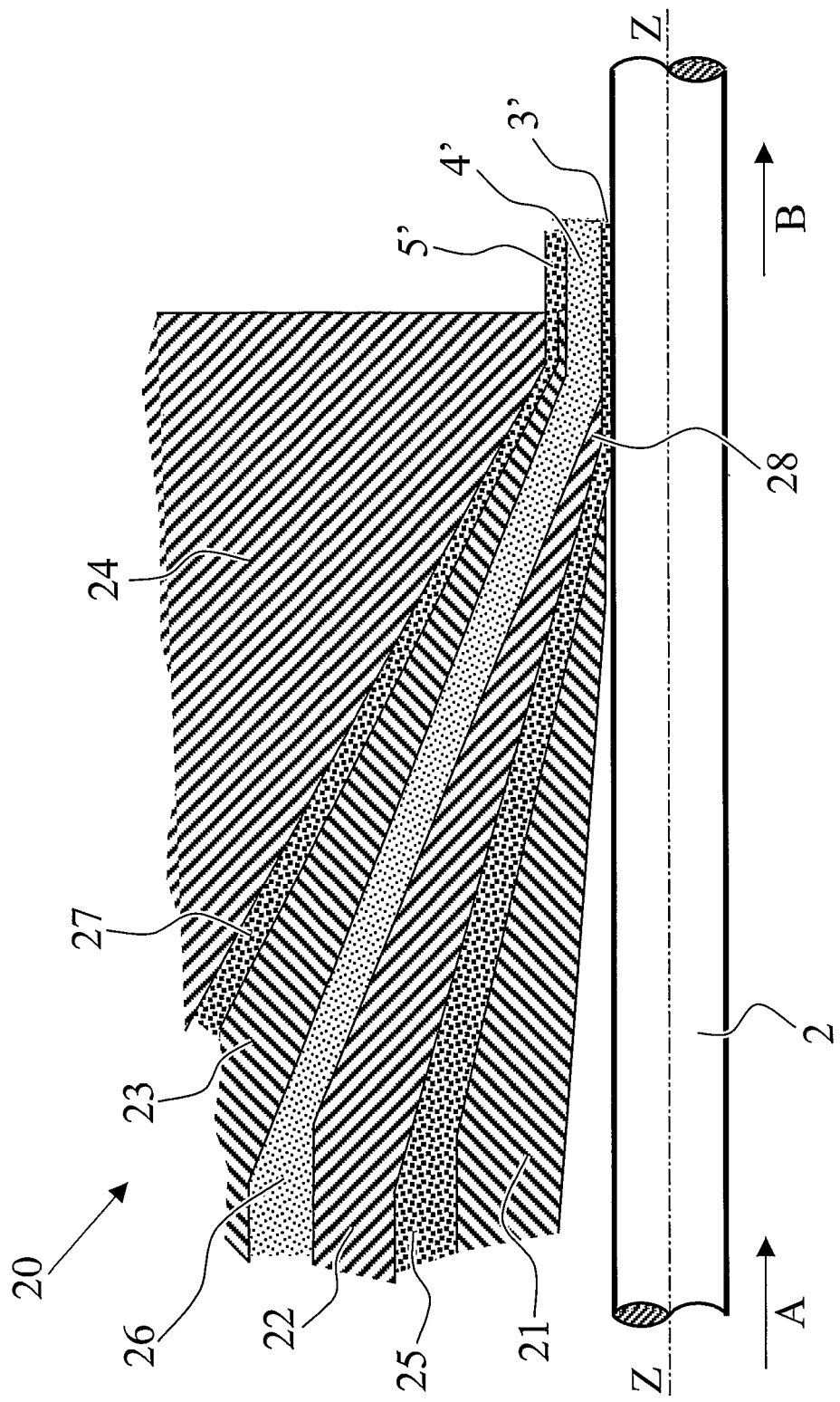
FIG. 2 is a partial view, in longitudinal section, of an extrusion head according to a conventional process for manufacturing a unipolar electrical cable.

FIG. 2 shows a partial view, in longitudinal section, of a conventional extrusion head for manufacturing the core of a unipolar electrical cable.

The cable conductor 2 is unwound from a feeding reel and delivered within an extrusion equipment provided with a triple layer extrusion head, said equipment comprising three separate extruders flowing into a common extrusion head so as to deposit an inner semiconductive layer 3', an insulating layer 4' and an outer semiconductive layer 5' on the conductor 2.

FIG. 2 shows a partial view in longitudinal cross section of a triple layer extrusion head 20 of an extrusion equipment which is known per sé and thus not shown in its entirety.

The extrusion head 20 comprises: a male die 21, a first intermediate die 22, a second intermediate die 23 and a female die 24. Said dies are arranged in the aforesaid sequence, concentrically overlapping each other and radially extending from the axis Z-Z of the conductor 2.

More particularly, arrow A indicates the advancing direction of the cable conductor 2, in a position radially external to which the inner semiconductive layer 3' is extruded through the conduit 25 provided between the male die 21 and the first intermediate die 22.

Arrow B indicates the exit direction of the cable core from the extrusion head 20.

According to the conventional manufacturing process known in the art and provided with the extrusion head 20 as partially and schematically shown in FIG. 2, while the conductor 2 is unwound from a feeding reel (not shown), the polymeric compositions of the inner semiconductive layer 3', the insulating layer 4' and the outer semiconductive layer 5' respectively are separately fed to the inlet of each extruder (not shown), for example by using separate hoppers, which is positioned upstream of the conduits 25, 26 and 27 respectively.

The production of said polymeric compositions can require a pre-mixing step of the polymeric base material with other components (e.g. fillers or additives), said pre-mixing step being performed in an equipment upstream of the extrusion process, such as for example an internal mixer of the tangential rotor type (Banbury) or with interpenetrating rotors, or in a continuous mixer of the Ko-Kneader type (e.g. manufactured by Buss) or of the type having two co-rotating or counter-rotating screws.

Each polymeric composition is generally delivered to the corresponding extruder in the form of granules and plasticized, that is converted into the molten state, through the input of heat (via the external cylinder of the extruder) and the mechanical action of a screw which works the polymeric material and presses it into the corresponding extrusion duct towards the outlet of each duct to form the desired coating layer.

According to the conventional extrusion head 20 shown in FIG. 2, the flows of the different materials forming the cable core constitutive layers (i.e. the inner semiconductive layer 3', the insulating layer 4' and the outer semiconductive layer 5') are kept separate from each other and separately extruded onto the cable core being formed.

In details, as clearly shown in FIG. 2, firstly the inner semiconductive layer 3' is extruded directly onto the cable conductor 2; successively the insulating layer 4' is extruded onto the inner semiconductive layer 3' (the latter being already coupled with the conductor 2) and finally the outer semiconductive layer 5' is extruded onto the insulating layer 4' when the latter is already coupled with the inner semiconductive layer 3'.

Such a specific extrusion sequence is obtained by means of the dies assembly schematically and partially shown in FIG. 2 according to which the first intermediate die 22 has an axial extension (along the conductor advancing direction) which is greater than that of the male die 21 so that the inner semiconductive material is directly extruded onto the cable conductor 2.

In details, the first intermediate die 22 is provided with an extended portion 28 which is arranged coaxially with respect to the cable conductor 2, said extended portion performing the function of guiding the inner semiconductive layer 3' onto the conductor 2 and keeping said inner semiconductive layer pressed upon the conductor for a sufficiently long distance, and therefore a sufficiently long period of time, so as to obtain a uniform and homogeneous thickness of the inner semiconductive layer.

Figure 3:
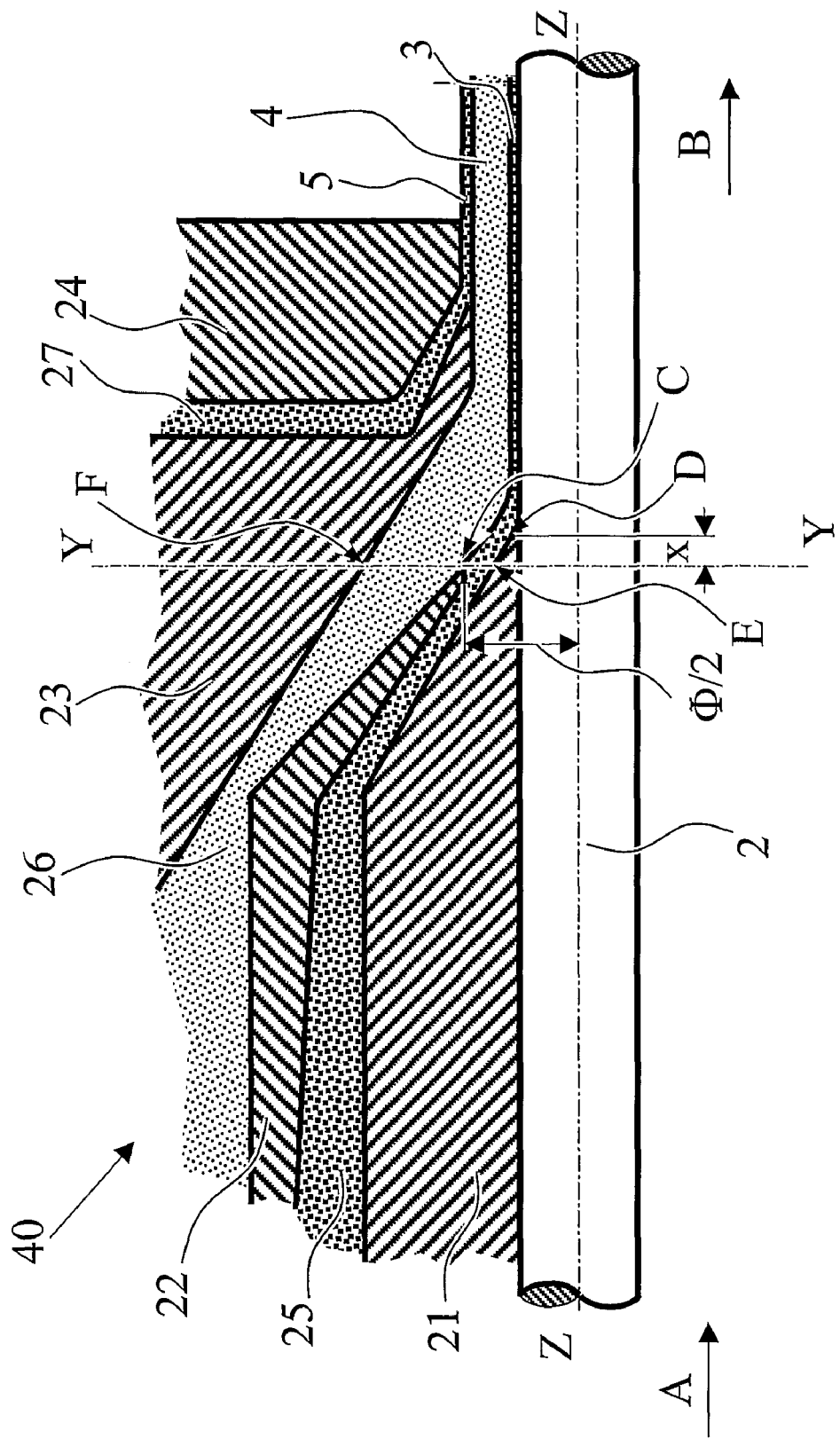
FIG. 3 is a partial view, in longitudinal section, of an extrusion head according to the manufacturing process of the present invention.

FIG. 3 is a partial view, in longitudinal section, of an extrusion head 40 for use in the manufacturing process of the present invention, the components of FIG. 3 that are similar or identical with respect to those of FIG. 2 being addressed to in the description with the same references.

According to the manufacturing process of the present invention, the inner semiconductive layer 3 contacts the insulating layer 4 at a position C which is located upstream of the contacting point D where the cable conductor 2 and the inner semiconductive layer 3 come into reciprocal contact.

In detail, in the extrusion head 40 of the present invention the first intermediate die 22 is moved back (along the conductor advancing direction) with respect to the axial end of the male die 21 so that the annular flow of the inner semiconductive material (which is extruded along the conduit 25) and the annular flow of the insulating material (which is extruded along the conduit 26) contact each other before being deposited onto the cable conductor 2. In such a manner, the inner semiconductive layer is allowed to contact the conductor 2 when the inner semiconductive layer flows together with the insulating layer.

Preferably, the contacting point C, i.e. the point wherein the outer surface of the annular flow of the inner semiconductive material and the inner surface of the annular flow of the insulating material contact each other, is located at an axial distance x with respect to the contacting point D, i.e. the point wherein the inner semiconductive layer contacts the conductor 2.

Preferably, said distance x is greater than or equal to 0.5 times the conductor diameter.

Within the present description, the term "axial distance" is intended a distance which is calculated along the axial direction, i.e. along the conductor advancing direction.

Preferably, said distance x is comprised from about 0.6 to about 10 times the conductor diameter, more preferably from about 1 to about 4 times the conductor diameter.

Preferably, the contacting point C is located at a diameter φ—with respect to the longitudinal axis Z-Z of the cable conductor—greater than or equal to 1.5 times the conductor diameter.

Preferably, said diameter φ is comprised from about 1.8 to about 4 times the conductor diameter, more preferably from about 2 to about 3 times the conductor diameter.

Figure 4:
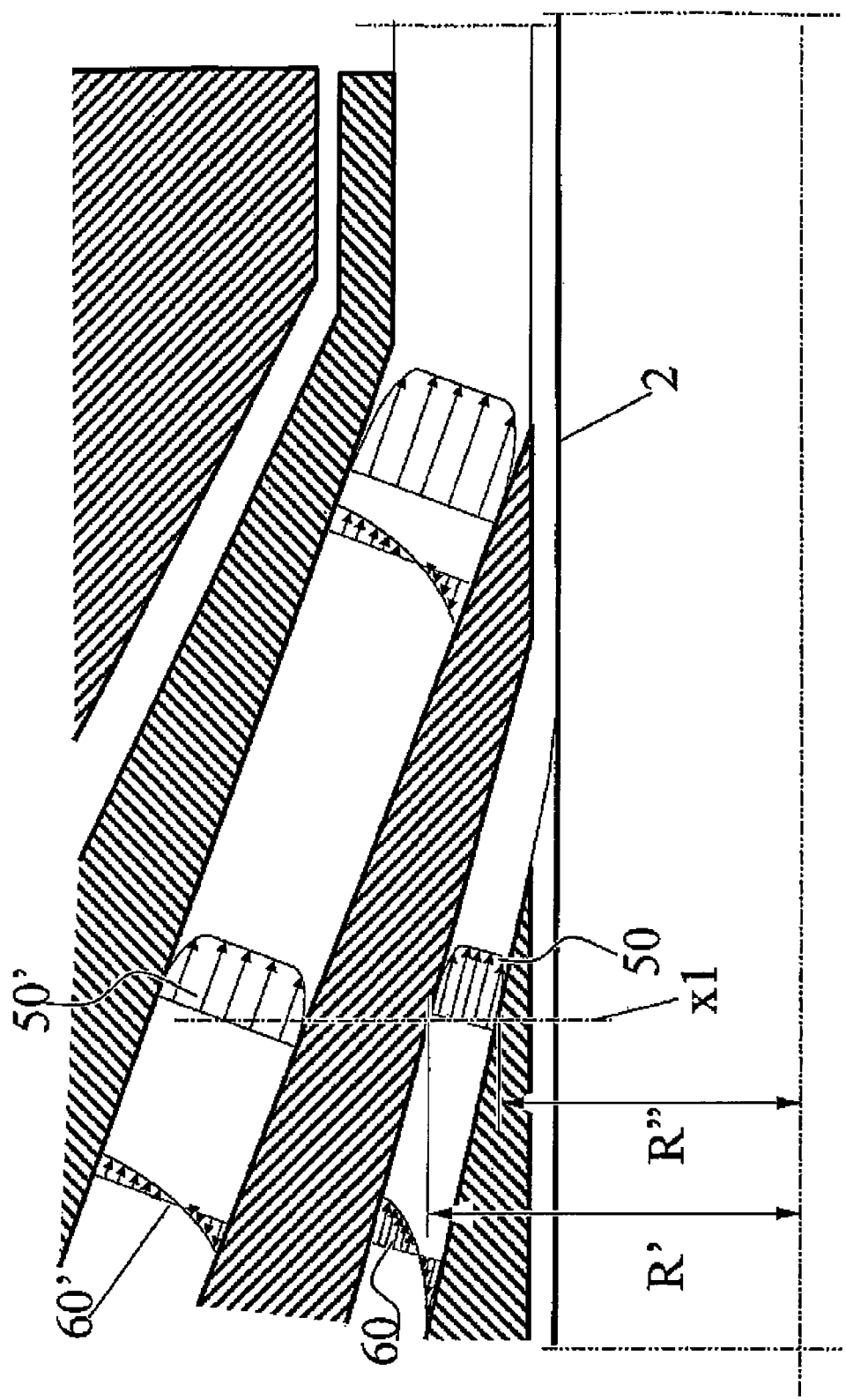
FIGS. 4 and 5 are schematic partial views of the velocity distribution and the shear stress distribution of a Newtonian and non-Newtonian fluid, respectively, flowing through an annular conduit.

FIG. 4 is a schematic and partial view of the velocity distribution 50 and the shear stress distribution 60 of the material of the inner semiconductive layer flowing in the annular conduit formed by the dies 21 and 22 in the extrusion head 20 according to the prior art, and, correspondingly, of the velocity distribution 50' and the shear stress distribution 60' of the material of the insulating layer flowing in the annular conduit formed by the dies 22 and 23 in the same prior art extrusion head, taken at a certain longitudinal position identified by plane x1.

As it is known in the art, the shear stress τ is the frictional force that one fluid layer has to overcome for sliding over an adjacent fluid layer. At a given temperature, the shear stress τ of a fluid is related to the shear rate γ' (i.e. γ̇=dy/dt).

The shear rate is the slope of the velocity distribution profile.

In its simplest version, for a Newtonian fluid, such relationship is:

$$\tau = \eta * \dot{\gamma}$$

wherein η is the dynamic viscosity of the fluid taken into consideration.

In a non-Newtonian fluid, as it is the case for the materials under consideration, the mathematical relationship takes a more complex form:

$$\tau = f(T, \dot{\gamma}).$$

In general, the velocity distribution profile 50, 50' of the fluid materials flowing through the relevant annular conduits of the extrusion head is such that the fluid maximum velocity is obtained in correspondence of the bulk of the flow, i.e. in the farthest position from the fixed surfaces defining the conduits, while the fluid materials velocity becomes zero in correspondence of the outer diameter of the conduit and in correspondence of the inner diameter of the conduit, i.e. at r=R', and at r=R", as shown with reference to velocity distribution profile 50 of FIG. 4.

In correspondence to such velocity distribution profiles, there are the shear stress distribution profiles 60, 60'.

As shown in FIG. 4, the shear stress τ becomes zero in correspondence of the bulk of the flow, i.e. in the farthest positions from the fixed surfaces defining the annular conduits, while the shear stress τ assumes its maximum absolute value in correspondence of the outer diameter of the conduit and in correspondence of the inner diameter of the conduit (i.e. in proximity of the die surfaces).

From such shear stress distribution profile it can be pointed out that for layers of small thickness, such as the inner semiconducting layer 3, the shear stress is significantly high, and it further increases the more the cross section of the conduit decreases, in particular because the annular conduit converges toward the conductor, resulting in an increased speed of the flowing material while moving towards the contacting point D.

This situation remains the same until the inner semiconductor material contacts the conductor and reaches its final outer diameter.

Figure 5:
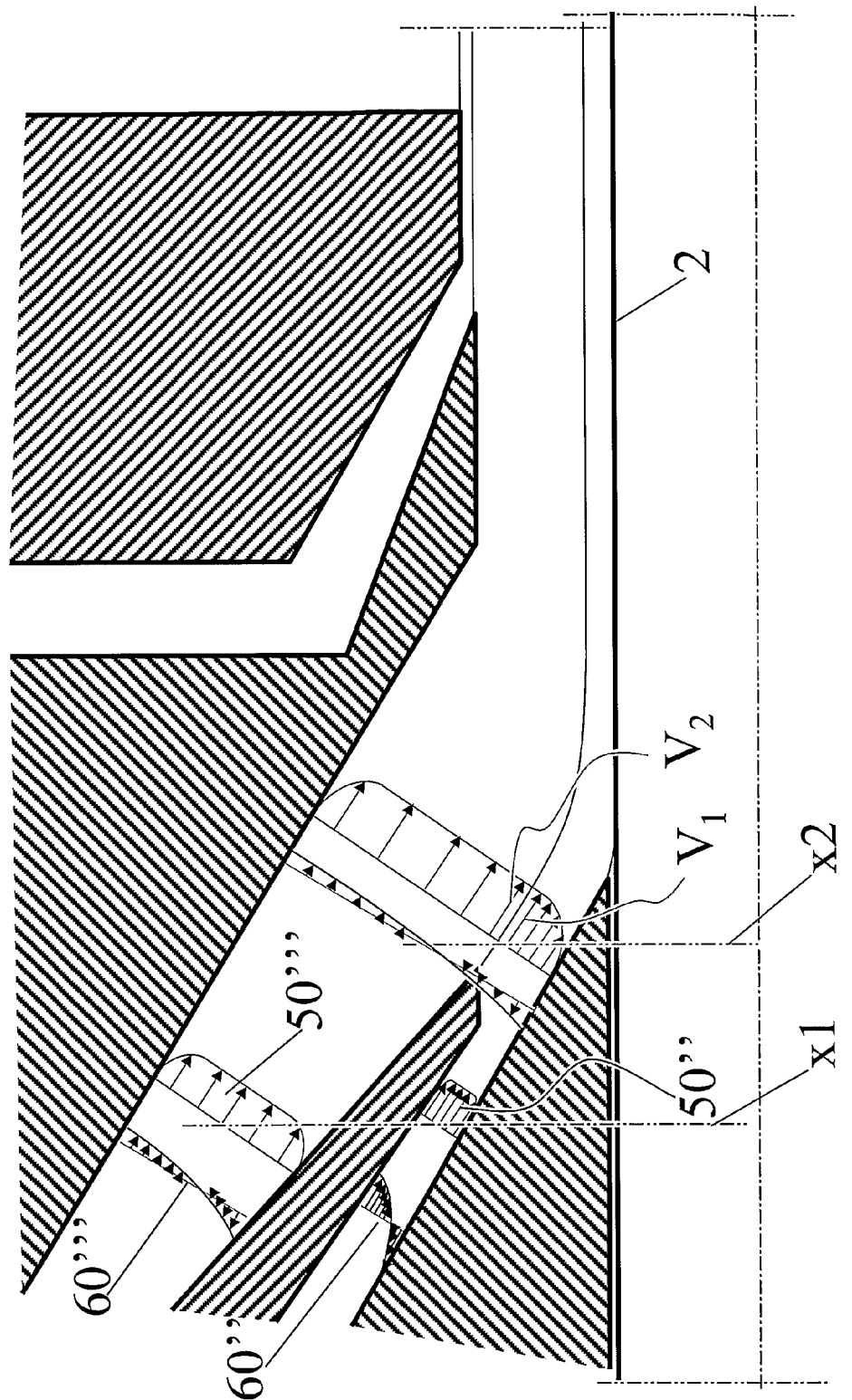

In the extrusion head 40 according to the present invention, as shown in FIG. 5, in a position x1, immediately before the end point C of the die 22, the velocity 50", 50''' and shear rate 60", 60''' distribution profiles are substantially the same as those described with reference to FIG. 4.

However, in a position x2, immediately downstream of the end point C, where the inner semiconducting layer and the insulating layer flows have already become in contact, the situation changes.

In fact, while the velocity of the two materials near the contact with the inner (21) and outer (23) dies still remain close or equal to zero, at the interface between the two flowing materials the two speeds V1 and V2 become substantially the same.

As a consequence, as the velocity is allowed to vary less sharply from zero to its maximum value, such velocity variation occurring through the whole thickness of the inner semiconducting layer and the insulating layer, the corresponding shear rate reaches smaller maximum values, and, in particular, the shear rate is close to zero at the interface of the two materials.

The convergence of the flow towards the conductor causes the overall flow velocity to increase because of the diminishing cross section for the flow, but, since the inner semiconducting layer and the insulating layer flow together, the maximum shear rate is maintained low until the inner semiconducting layer contacts the conductor 2.

Preferably, the longitudinal position where the inner semiconducting layer and the insulating layer flows becomes into contact (i.e. the position of the die end C) is such that the ratio between the shear stress of the inner semiconductive layer 3 at the radially inner wall of the first intermediate die 22 and the shear stress of the insulating layer 4 at the radially outer wall of the first intermediate die 22, in proximity of the contacting point C, is comprised from about 0.5 to about 4.

For further description of the invention, some illustrative examples are given below.

Example 1 (Invention)

A unipolar medium voltage cable, of the type shown in FIG. 1, was produced.

For the purposes of the present invention, the manufacture of only the cable core (i.e. the inner semiconductive layer 3, the insulating layer 4 and the outer semiconductive layer 5) was carried out by means of the extrusion head 40 illustrated in FIG. 3.

The cable conductor was a solid rod made of aluminum and having a cross section of 150 mm². The advancing speed of the conductor was set to about 60 m/min.

An inner semiconductive layer (the polyethylene copolymer HFDA-0801—commercial product of Dow Chemicals) having a thickness of 0.2 mm, an insulating layer (cross-linked polypropylene under the brand name of LE 4201 produced by Borealis) having a thickness of 4.0 mm, and an outer semiconductive layer (the polyethylene copolymer HFDA-0801—commercial product of Dow Chemicals) having a thickness of 0.2 mm were obtained by using the manufacturing process of the present invention.

A 90 mm extruder (by Costruzioni Meccaniche Luigi Bandera S.p.A.—Busto Arsizio (VA)—Italy) in configuration 25 D (i.e. with screw length 25 times its diameter), a 160 mm single-screw Bandera extruder in configuration 30 D and a 90 mm Bandera extruder in configuration 25 D were used to deposit the inner semiconductive layer, the insulating layer and the outer semiconductive layer, respectively.

The contacting point C, i.e. the point in which the outer surface of the annular flow of the inner semiconductive material and the inner surface of the annular flow of the insulating material contact each other, was located at an axial distance x—measured from the contacting point D along the longitudinal direction Z-Z of the cable—equal to 0.69 times the conductor diameter.

The extrusion output of the inner semiconductive material was fixed to 33.5 kg/h, while the extrusion output of the insulating material was fixed to 720 kg/h.

The inner diameter of the annular flow of the inner semiconductive material in correspondence of the contacting point C (i.e. the inner diameter of the male die 21 at point E, said point being obtained by intersecting the male die with a plane Y-Y perpendicular to the conductor axis Z-Z and contacting the first intermediate die 22 at point C) was 25.2 mm.

The outer diameter of the annular flow of the inner semiconductive material (i.e. the diameter of the first intermediate die 22 at point C) was 26.4 mm.

The inner diameter of the annular flow of the insulating material in correspondence of the contacting point C was 26.4 mm.

The outer diameter of the annular flow of the insulating material (i.e. the outer diameter of the second intermediate die 23 at point F, said point being obtained by intersecting the second intermediate die with the plane Y-Y) was 36.8 mm.

The extrusion temperature of the inner semiconductive material and of the insulating material was fixed to 130° C.

Having fixed the extrusion outputs of the inner semiconductive material and of the insulating material, the extrusion temperature thereof as well as the dies geometries, the ratio between the shear stress of the inner semiconductive layer at the radially inner wall of the first intermediate die and the shear stress of the insulating layer at the radially outer wall of the first intermediate die, in proximity of the contacting point C (i.e. before coming into reciprocal contact), was calculated by taking into consideration the dynamic viscosities of said materials (measured by means of a capillary rheometric analysis using a Göttfert laboratory rheometer Rheograph 2001 type equipped with a capillary having 1 mm internal diameter and a length of 20 mm) as a function of the extrusion temperature and the shear rate. In detail, Tables 1 and 2 show the dynamic viscosities as a function of the extrusion temperature and the shear rate for the inner semiconductive material and the insulating material, respectively.

TABLE 1

Inner semiconductive material
HFDA-0801 by Dow Chemicals

| Shear Rate ($s^{-1}$) | Dynamic Viscosity (Pa * s) | Temperature (° C.) |
|---|---|---|
| 10 | 26130 | 110 |
| 50 | 10380 | 110 |
| 100 | 6545 | 110 |
| 1000 | 1114 | 110 |
| 2500 | 519 | 110 |
| 10 | 26370 | 120 |
| 50 | 9404 | 120 |
| 100 | 5886 | 120 |
| 1000 | 1038 | 120 |
| 2500 | 482 | 120 |
| 10 | 24660 | 130 |
| 50 | 8867 | 130 |
| 100 | 5568 | 130 |
| 1000 | 1003 | 130 |
| 2500 | 469 | 130 |

TABLE 2

Insulating material
LE 4201 by Borealis

| Shear Rate ($s^{-1}$) | Dynamic Viscosity (Pa * s) | Temperature (° C.) |
|---|---|---|
| 10 | 8222 | 120 |
| 50 | 2377 | 120 |
| 100 | 1498 | 120 |
| 1000 | 340 | 120 |
| 2500 | 167 | 120 |
| 10 | 7327 | 130 |
| 50 | 2051 | 130 |
| 100 | 1278 | 130 |

TABLE 2-continued

Insulating material
LE 4201 by Borealis

| Shear Rate ($s^{-1}$) | Dynamic Viscosity (Pa * s) | Temperature (° C.) |
|---|---|---|
| 1000 | 277 | 130 |
| 2500 | 2500 | 130 |

The ratio between the shear stress of the inner semiconductive layer and the shear stress of the insulating layer was equal to 3.7.

An optical inspection was carried out on the cable core constitutive elements (e.g. by means of a Scanning Electron Microscope) which confirmed a homogeneous and uniform thickness (in the radial and longitudinal directions) of the inner semiconductive layer and of the insulating layer, as well as the absence of tearings or defects at the interface thereof.

Example 2 (Invention)

A unipolar medium voltage cable, of the type shown in FIG. 1 and described in Example 1, was produced.

For the purposes of the present invention, the manufacture of only the cable core (i.e. the inner semiconductive layer 3, the insulating layer 4 and the outer semiconductive layer 5) was carried out by means of the extrusion head 40 illustrated in FIG. 3.

The cable conductor was a solid rod made of aluminum and having a cross section of 150 mm². The advancing speed of the conductor was set to about 58 m/min.

An inner semiconductive layer (made by the semiconductive material shown in Table 3) having a thickness of 0.2 mm, an insulating layer (made by the insulating material shown in Table 3) having a thickness of 2.6 mm, and an outer semiconductive layer (made by the semiconductive material shown in Table 3) having a thickness of 0.2 mm were obtained by using the manufacturing process of the present invention.

TABLE 3

| | Inner and Outer semiconductive layers (% by weight) | Insulating layer (% by weight) |
|---|---|---|
| Adflex ® Q 200 F | 60.4 | — |
| Hifax ® CA 7320 A | — | 47 |
| Moplen ® RP210G | — | 47 |
| Ensaco ® 250 G | 33 | — |
| Jarylec ® Exp3 | 6 | 5.4 |
| Irganox ® PS 802 | 0.4 | 0.4 |
| Irganox ® 1010 | 0.2 | 0.2 |

Adflex ® Q 200 F: a propylene heterophase copolymer with melting point 165° C., melting enthalpy 30 J/g, MFI 0.8 dg/min and flexural modulus 150 MPa (commercial product of BaseII);
Hifax ® CA 7320 A: thermoplastic polyolefin with high rubber content (commercial product of BaseII);
Moplen ® RP210G: polypropylene random copolymer (commercial product of BaseII);
Ensaco ® 250 G: furnace carbon black (commercial product of Erachem Europe);
Jarylec ® Exp3 (commercial product of Elf Atochem): dibenzyltoluene (DBT);
Irganox ® PS 802 (antioxidant): distearyl thiodipropionate (commercial product of Ciba Specialty Chemicals);
Irganox ® 1010 (antioxidant): pentaerithrityl-tetrakis-(3-(3,5-di-t-butyl-4-hydroxy-phenyl)-propionate (commercial product of Ciba Specialty Chemicals).

A 90 mm Bandera extruder in configuration 25 D, a 160 mm single-screw Bandera extruder in configuration 30 D and a 90 mm Bandera extruder in configuration 25 D were used to deposit the inner semiconductive layer, the insulating layer and the outer semiconductive layer respectively.

The contacting point C, i.e. the point in which the outer surface of the annular flow of the inner semiconductive material and the inner surface of the annular flow of the insulating material contact each other, was located at an axial distance x—from the contacting point D—equal to 0.69 times the conductor diameter.

The extrusion output of the inner semiconductive material was fixed to 32.6 kg/h, while the extrusion output of the insulating material was fixed to 450 kg/h.

The inner diameter of the annular flow of the inner semiconductive material in correspondence of the contacting point C was 25.2 mm.

The outer diameter of the annular flow of the inner semiconductive material was 26.4 mm.

The inner diameter of the annular flow of the insulating material in correspondence of the contacting point C was 26.4 mm.

The outer diameter of the annular flow of the insulating material was 36.8 mm.

The extrusion temperature of the inner semiconductive material and of the insulating material was set to 230° C.

Having fixed the extrusion outputs of the inner semiconductive material and of the insulating material, the extrusion temperature thereof as well as the dies geometries, the ratio between the shear stress of the inner semiconductive layer at the radially inner wall of the first intermediate die and the shear stress of the insulating layer at the radially outer wall of the first intermediate die, in proximity of the contacting point C (i.e. before coming into reciprocal contact), was calculated by taking into consideration the dynamic viscosities of said materials (measured by means of a capillary rheometric analysis using a Göttfert laboratory rheometer Rheograph 2001 type equipped with a capillary having 1 mm internal diameter and a length of 20 mm) as a function of the extrusion temperature and the shear rate.

In detail, Tables 4 and 5 show the dynamic viscosities as a function of the extrusion temperature and the shear rate for the inner semiconductive material and the insulating material, respectively.

TABLE 4

Inner semiconductive material
(as reported in Table 3)

| Shear Rate ($s^{-1}$) | Dynamic Viscosity (Pa * s) | Temperature (° C.) |
|---|---|---|
| 10 | 6106 | 180 |
| 50 | 2735 | 180 |
| 100 | 1758 | 180 |
| 1000 | 329 | 180 |
| 2500 | 167 | 180 |
| 10 | 5866 | 200 |
| 50 | 2629 | 200 |
| 100 | 1604 | 200 |
| 1000 | — | 200 |
| 2500 | — | 200 |

TABLE 5

Insulating material
(as reported in Table 3)

| Shear Rate ($s^{-1}$) | Dynamic Viscosity (Pa * s) | Temperature (° C.) |
|---|---|---|
| 10 | 6024 | 170 |
| 50 | 2328 | 170 |
| 100 | 1555 | 170 |
| 1000 | 366 | 170 |
| 2500 | 224 | 170 |

TABLE 5-continued

Insulating material
(as reported in Table 3)

| Shear Rate ($s^{-1}$) | Dynamic Viscosity (Pa * s) | Temperature (° C.) |
|---|---|---|
| 10 | 4640 | 190 |
| 50 | 1954 | 190 |
| 100 | 1335 | 190 |
| 1000 | 267 | 190 |
| 2500 | 132 | 190 |
| 10 | | 210 |
| 50 | 3582 | 210 |
| 100 | 1628 | 210 |
| 1000 | 234 | 210 |
| 2500 | 117 | 210 |

The ratio between the shear stress of the inner semiconductive layer and the shear stress of the insulating layer was equal to 3.0.

An optical inspection was carried out on the cable core constitutive elements (e.g. by means of a Scanning Electron Microscope) which confirmed a homogeneous and uniform thickness (in the radial and longitudinal directions) of the inner semiconductive layer and of the insulating layer, as well as the absence of tearings or defects at the interface thereof.

Example 3 (Invention)

A cable similar to that of Example 2 was produced, the only difference being that the extrusion output of the inner semiconductive material was fixed to 33.5 kg/h and the extrusion output of the insulating material was fixed to 720 kg/h.

The ratio between the shear stress of the inner semiconductive layer and the shear stress of the insulating layer was equal to 2.6.

The optical inspection carried out as mentioned in Examples 1 and 2 resulted in a homogeneous and uniform thickness (in the radial and longitudinal directions) of the inner semiconductive layer and of the insulating layer, as well as in the absence of tearings or defects at the interface thereof.

Example 4 (Invention)

A cable similar to that of Example 2 was produced, the only differences being that: 1) the extrusion output of the inner semiconductive material was fixed to 23.9 kg/h; 2) the extrusion output of the insulating material was fixed to 720 kg/h; 3) the advancing speed of the conductor was set to about 43 m/min, and 4) the thickness of the insulating layer was of about 5.5 mm.

The ratio between the shear stress of the inner semiconductive layer and the shear stress of the insulating layer was equal to 2.4.

The optical inspection carried out as mentioned in Examples 1 and 2 resulted in a homogeneous and uniform thickness (in the radial and longitudinal directions) of the inner semiconductive layer and of the insulating layer, as well as in the absence of tearings or defects at the interface thereof.

Example 5 (Comparative)

A unipolar medium voltage cable, of the type shown in FIG. 1 and described in Example 2, was produced.

The cable conductor was a solid rod made of aluminum and having a cross section of 150 mm. The advancing speed of the conductor was set to about 58 m/min.

An inner semiconductive layer (the polyethylene copolymer HFDA-0801—commercial product of Dow Chemicals) having a thickness of 0.2 mm, an insulating layer (cross-linked polypropylene under the brand name of LE 4201 produced by Borealis) having a thickness of 2.6 mm, and an outer semiconductive layer (the polyethylene copolymer HFDA-0801—commercial product of Dow Chemicals) having a thickness of 0.2 mm were obtained by using the manufacturing process of the present invention.

A 90 mm Bandera extruder in configuration 25 D, a 160 mm single-screw Bandera extruder in configuration 30 D and a 90 mm Bandera extruder in configuration 25 D were used to deposit the inner semiconductive layer, the insulating layer and the outer semiconductive layer respectively.

The contacting point C, i.e. the point in which the outer surface of the annular flow of the inner semiconductive material and the inner surface of the annular flow of the insulating material contact each other, was located at an axial distance x—from the contacting point D—equal to 0.24 times the conductor diameter.

The extrusion output of the inner semiconductive material was fixed to 32.6 kg/h, while the extrusion output of the insulating material was fixed to 450 kg/h.

The inner diameter of the annular flow of the inner semiconductive material in correspondence of the contacting point C was 18.0 mm.

The outer diameter of the annular flow of the inner semiconductive material was 18.5 mm.

The inner diameter of the annular flow of the insulating material in correspondence of the contacting point C was 18.5 mm.

The outer diameter of the annular flow of the insulating material was 33.0 mm.

The extrusion temperature of the inner semiconductive material and of the insulating material was set to 130° C.

Having fixed the extrusion outputs of the inner semiconductive material and of the insulating material, the extrusion temperature thereof as well as the dies geometries, the ratio between the shear stress of the inner semiconductive layer at the radially inner wall of the first intermediate die and the shear stress of the insulating layer at the radially outer wall of the first intermediate die, in proximity of the contacting point C (i.e. before coming into reciprocal contact), was calculated by taking into consideration the dynamic viscosities of said materials (measured by means of a capillary rheometric analysis using a Göttfert laboratory rheometer Rheograph 2001 type equipped with a capillary having 1 mm internal diameter and a length of 20 mm) as a function of the extrusion temperature and the shear rate.

In details, Tables 1 and 2 show the dynamic viscosities as a function of the extrusion temperature and the shear rate for the inner semiconductive material and the insulating material, respectively.

The ratio between the shear stress of the inner semiconductive layer and the shear stress of the insulating layer was equal to 10.1.

An optical inspection was carried out on the cable core constitutive elements (e.g. by means of a Scanning Electron Microscope) and interpenetration of the inner semiconductive layer and of the insulating layer (i.e. non-homogeneous and non-uniform thicknesses of said layers) as well as tearings of the inner semiconductive layer at some portions of the interface of said layers were detected.

The invention claimed is:

1. A process for manufacturing a cable comprising:
   a conductor;
   an inner semiconductive layer surrounding said conductor and having a thickness lower than or equal to 0.4 mm; and
   an insulating layer surrounding said inner semiconductive layer,
   said process comprising the steps of:
      feeding the conductor at a predetermined feeding speed to an extrusion head comprising a first extrusion channel for extruding the inner semiconductive layer and a second extrusion channel for extruding the insulating layer, said first extrusion channel and said second extrusion channel being separated from each other by a first extrusion die; and
      co-extruding the inner semiconductive layer and the insulating layer, said step of co-extruding comprising:
         providing a first annular flow of inner semiconductive material in fluid form and a second annular flow of insulating material in fluid form;
         contacting the outer surface of said first annular flow and the inner surface of said annular flow at a first contacting point while maintaining said materials in fluid form at an axial distance from a second contacting point where the inner surface of said first annular flow contacts the conductor;
         selecting in combination said predetermined feeding speed and said first contacting point as a function of the dynamic viscosity of the inner semiconductive material in fluid form and of the insulating material in fluid form, so that a ratio between the shear stress of the inner semiconductive layer at the radially inner wall of said first extrusion die and the shear stress of the insulating layer at the radially outer wall of said first extrusion die, in proximity of said first contacting point, is about 0.5 to 4; and
      compression extruding the insulating layer and the inner semiconductive layer onto the conductor.

2. The process according to claim 1, wherein said axial distance is greater than or equal to 0.5 times the conductor diameter.

3. The process according to claim 2, wherein said axial distance is about 0.6 to about 10 times the conductor diameter.

4. The process according to claim 3, wherein said axial distance is about 1 to about 4 times the conductor diameter.

5. The process according to claim 1, wherein said ratio is about 0.7 to about 3.0.

6. The process according to claim 5, wherein said ratio is about 1.

7. The process according to claim 1, wherein the first contacting point contacting point of the outer surface of the annular flow of the inner semiconductive material and the inner surface of the annular flow of the insulating material is located at a diameter greater than or equal to 1.5 times the diameter of the conductor.

8. The process according to claim 7, wherein said diameter is about 1.8 to about 4.0 times the diameter of the conductor.

9. The process according to claim 8, wherein said diameter is about 2.0 to about 3.0 times the diameter of the conductor.

10. The process according to claim 1, wherein the thickness of the inner semiconductive layer is about 0.1 mm to about 0.4 mm.

11. The process according to claim 10, wherein said thickness is about 0.2 mm to about 0.3 mm.

12. The process according to claim 11, wherein the conductor is a solid rod.

13. The process according to claim 1, further comprising the step of providing an outer semiconductive layer surrounding said insulating layer to obtain a cable core.

14. The process according to claim 1, further comprising the step of cooling the cable core.

15. The process according to claim 1, further comprising the step of drying the cable core.

16. The process according to claim 1, further comprising the step of providing a metal shield around said cable core.

17. The process according to claim 16, further comprising the step of applying an impact protecting element around the metal shield.

18. The process according to claim 16, further comprising the step of applying an oversheath around the metal shield.

19. The process according to claim 1, wherein said predetermined feeding speed is about 30 to about 100 m/min.

20. The process according to claim 1, wherein the thickness of the insulating layer is not higher than 2.5 mm.

21. The process according to claim 1, wherein the inner semiconductive layer is made of a thermoplastic material.

22. The process according to claim 1, wherein the insulating layer is made of a thermoplastic material.

* * * * *